(12) United States Patent
Kawasaki et al.

(10) Patent No.: US 8,744,194 B2
(45) Date of Patent: Jun. 3, 2014

(54) BOUNDARY LINE RECOGNITION APPARATUS

(75) Inventors: Naoki Kawasaki, Kariya (JP); Hiroki Nakano, Kariya (JP); Kenta Hoki, Oobu (JP); Tetsuya Takafuji, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 838 days.

(21) Appl. No.: 12/798,601

(22) Filed: Apr. 7, 2010

(65) Prior Publication Data
US 2010/0259617 A1 Oct. 14, 2010

(30) Foreign Application Priority Data
Apr. 9, 2009 (JP) ................................ 2009-094773

(51) Int. Cl.
G06K 9/48 (2006.01)
H04N 7/00 (2011.01)
H04N 7/18 (2006.01)

(52) U.S. Cl.
USPC ........................... 382/199; 348/113; 701/523

(58) Field of Classification Search
CPC .......................... G06K 9/00789; G05D 1/0246
USPC .......................... 382/100, 104, 192, 195, 199; 701/300–302, 523; 348/113
See application file for complete search history.

(56) References Cited

U.S. PATENT DOCUMENTS

| | | | |
|---|---|---|---|
| 6,445,809 B1 * | 9/2002 | Sasaki et al. .................. | 382/104 |
| 6,697,535 B1 * | 2/2004 | Dutta-Choudhury ......... | 382/266 |
| 7,295,682 B2 | 11/2007 | Otsuka et al. | |
| 7,542,825 B2 | 6/2009 | Kawasaki | |
| 2005/0125154 A1 * | 6/2005 | Kawasaki ...................... | 701/301 |
| 2005/0196019 A1 * | 9/2005 | Taniguchi et al. ............ | 382/104 |
| 2007/0041614 A1 * | 2/2007 | Tanji ............................. | 382/104 |
| 2008/0007619 A1 * | 1/2008 | Shima et al. .................. | 348/118 |
| 2008/0192984 A1 | 8/2008 | Higuchi et al. | |
| 2010/0228437 A1 * | 9/2010 | Hanzawa et al. ............... | 701/41 |

FOREIGN PATENT DOCUMENTS

| | | |
|---|---|---|
| JP | 07-311896 | 11/1995 |
| JP | 07-319541 | 12/1995 |
| JP | 08-320998 | 12/1996 |
| JP | 11-070884 | 3/1999 |
| JP | 11-180328 | 7/1999 |
| JP | 11-296799 | 10/1999 |
| JP | 2003-061087 | 2/2003 |
| JP | 2003-067755 | 3/2003 |
| JP | 2003-123058 | 4/2003 |

(Continued)

Primary Examiner — Yubin Hung
(74) Attorney, Agent, or Firm — Harness, Dickey & Pierce, PLC

(57) ABSTRACT

In a boundary line recognition apparatus, a boundary line candidate extracting part extracts boundary line candidates from image data obtained by an on-vehicle camera based on known image processing such as pattern matching and Hough transform. One or more kinds of boundary line feature calculating parts calculate one or more likelihoods of each boundary line candidate. The likelihood indicates a degree of probability to be the boundary line. A boundary line feature combining means multiplies the likelihoods of each boundary line candidate and outputs a combined likelihood. A boundary line candidate selecting part selects the boundary line candidate having a maximum likelihood as the boundary line. The boundary line feature calculating part further calculates the likelihood of the boundary line candidate using a dispersion of brightness and an internal edge amount, and changes the likelihood based on an additional likelihood obtained by a driving lane surface feature extracting part.

4 Claims, 11 Drawing Sheets

(56) References Cited

FOREIGN PATENT DOCUMENTS

| | | |
|---|---|---|
| JP | 2005-018148 | 1/2005 |
| JP | 2005-165421 | 6/2005 |
| JP | 2005-251106 | 9/2005 |
| JP | 2007-220013 | 8/2007 |
| JP | 2008-102684 | 5/2008 |
| JP | 2008-197863 | 8/2008 |

* cited by examiner

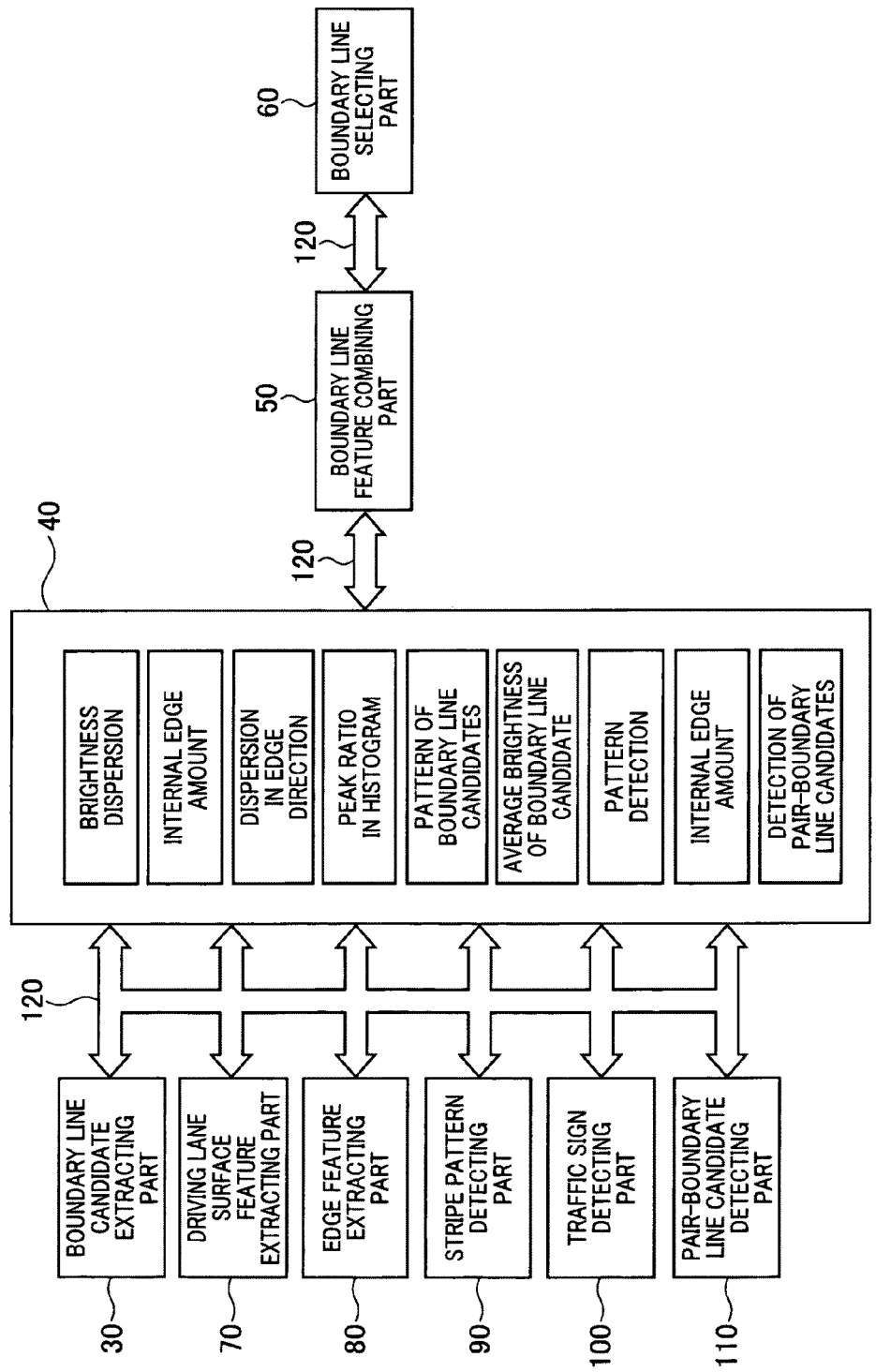

EXAMPLE OF WHITE BOUNDARY LINE
ON DRIVING LANE, WHICH ALMOST DISAPPEARS

EXAMPLE OF NARROW-WIDTH BOUNDARY LINE

BOUNDARY LINE RECOGNITION APPARATUS

CROSS-REFERENCE TO RELATED APPLICATION

This application is related to and claims priority from Japanese Patent Application No. 2009-094773 filed on Apr. 9, 2009, the contents of which are hereby incorporated by reference.

BACKGROUND OF THE INVENTION

1. Field of the Invention

The present invention relates to a boundary line recognition apparatus capable of detecting a boundary line on a driving lane of a vehicle in order to assist the driver of the vehicle.

2. Description of the Related Art

There is a conventional driving lane departing warning apparatus to assist a vehicle driver capable of providing a warning to the vehicle driver when a vehicle departs from the current driving lane. In general, such a conventional apparatus is comprised of an image acquiring part, an image processing part, and a warning generation part. The image acquiring part has one or more on-vehicle cameras. The image processing part processes image data transferred from the image acquiring part. The warning generation part generates a warning based on the processing result transferred from the image processing part, and provides the generated warning to the vehicle driver.

The image processing part detects or estimates a boundary line of a driving lane based on image data obtained by the image acquiring part. The warning generation part calculates a right distance measured from the vehicle to a right-side boundary line of the driving lane, and a left distance measured from the vehicle to a left-side boundary line of the driving lane. When one of the calculated distances is not more than a predetermined threshold value, in other words, when the driver's vehicle approaches the boundary line within a distance indicated by the threshold value, the warning generation part generates and provides a warning to the vehicle driver.

In such an apparatus capable of providing a warning to the vehicle driver when the vehicle departs from the current driving lane, an important problem is a wrong detection based on noise. For example, there are various error sources to generate such a wrong detection, for example, a dirty mark on a driving lane, traffic signs painted on a driving lane, a light reflected from a puddle on a road, a shadow of the driver's vehicle, a shadow of a following vehicle, etc.

In order to avoid such a wrong detection caused by the influence from those error sources and extract a target boundary line as a target in warning by eliminating the influence of noise, there has been proposed a conventional technique to calculate a degree of probability of each boundary line candidate which contains such noise, and selects the candidate having a highest probability.

For example, Japanese patent laid open publication No. JP 2005-18148 discloses such a conventional technique to calculate the target candidate having a highest probability based on the number of boundary line candidates, a strength of an edge of the boundary line candidate, a contrast in brightness of an area around the boundary line candidate, etc.

However, the conventional technique disclosed in JP 2005-18148 needs performing an optimum process suitable for each of: (a) the number of boundary line candidates; (b) an edge strength of a boundary line candidate; and (c) a contrast in brightness of an area around the boundary line candidate, etc., and finally combining the results of those process (a), (b), and (c).

This needs complex processing, and makes it difficult to improve those processes and add an additional function to the processes. That is, in order to improve a robust control to perform image data processing, it is generally required to improve each process and add an additional process. However, because combining each of the functions needs performing a complex process, this makes it difficult to perform the combination of the processes and the functions.

SUMMARY OF THE INVENTION

It is an object of the present invention to provide a boundary line recognition apparatus capable of correctly detecting a boundary line on the driving lane of a vehicle and providing a warning to the driver of the vehicle by combining the results of a plurality of processes even if such processes are improved, and an additional process is added.

To achieve the above purposes, the present invention provides a boundary line recognition apparatus is comprised of an on-vehicle camera, a boundary line candidate extracting means, one or more boundary line feature calculating means, a boundary line feature combining means, and a boundary line selecting means.

The on-vehicle camera acquired image data of the area around a vehicle, and outputs the image data. The boundary line candidate extracting means extracts boundary line candidates on a driving lane on which the vehicle drives based on the image data obtained by the on-vehicle camera. The boundary line feature calculating means are composed of one or more calculating means which calculate likelihoods which indicate a degree of probability of each of the boundary line candidates extracted by the boundary line candidate extracting means.

The boundary line feature combining means combines the likelihoods of each of the boundary line candidates calculated by one or more calculating means in the boundary line feature calculating means, and outputs a combined likelihood of each of the boundary line candidates. The boundary line selecting means selects the boundary line candidate having the maximum likelihood as the boundary line of the driving lane of the vehicle.

The boundary line recognition apparatus having the above structure extracts the boundary line candidates on the driving lane of the vehicle based on the image data obtained by the on-vehicle camera.

Such boundary line candidates, extracted from the image data obtained by the on-vehicle camera, are data items, which are related to an actual boundary line, for example, white traffic signs on the driving lane obtained by performing known image processing (such as pattern matching process, and Hough transform to extract a straight line using the number of votes (solid line-dotted line judgment result)).

The data relating to an actual boundary line contains some unreliability in determining it to be the actual boundary line on the driving lane of a vehicle because the boundary line candidate extracted from the image data by the known image processing contains noise such as a shadow of a guardrail, a repair line on a driving lane, a trace of a traffic sign, and a traffic sign even if the boundary line candidate has some likelihood of not less than a predetermined value.

The degree of probability of each boundary line candidate is calculated as the likelihood of the boundary line by one or more boundary line feature calculating means.

One or more boundary line feature calculating means correspond to methods of calculating the number of voted in Hough transform to extract a straight line (as results on solid line and dotted line judgment), a contrast (as an edge strength), a width of a while line, a pattern similarity and a brightness similarity when compared with a surface of the driving lane, and a boundary line feature.

The calculated likelihoods of each of the boundary line candidates are multiplied together to obtain the final likelihood of each of the boundary line candidates. The boundary line candidate having the maximum likelihood is then selected as the boundary line on the driving lane of the vehicle.

That is, because one or more boundary line feature calculating means calculate all of features of the boundary line candidate by using likelihoods as the degree of probability to be the boundary line, the degree of probability of the boundary line candidate to be the boundary line can be obtained by using the likelihoods regardless of the type of the boundary line feature calculating means. In other words, using the likelihoods of the boundary line candidate makes it possible to easily combine the calculation results of each of the boundary line feature calculating means by performing multiplication regardless of the type and content of the processes to calculate various features of the boundary line candidate.

In other words, using the likelihood makes it possible to easily combine the results of a plurality of processes even if one or more the boundary line feature calculation means are improved and/or an additional boundary line feature calculation means performing a new boundary line feature process is added.

BRIEF DESCRIPTION OF THE DRAWINGS

A preferred, non-limiting embodiment of the present invention will be described by way of example with reference to the accompanying drawings, in which:

FIG. 2 is a functional block diagram showing a schematic configuration of an image processing device in the boundary line recognition apparatus according to the embodiment of the present invention;

DETAILED DESCRIPTION OF THE PREFERRED EMBODIMENTS

Figure 1:
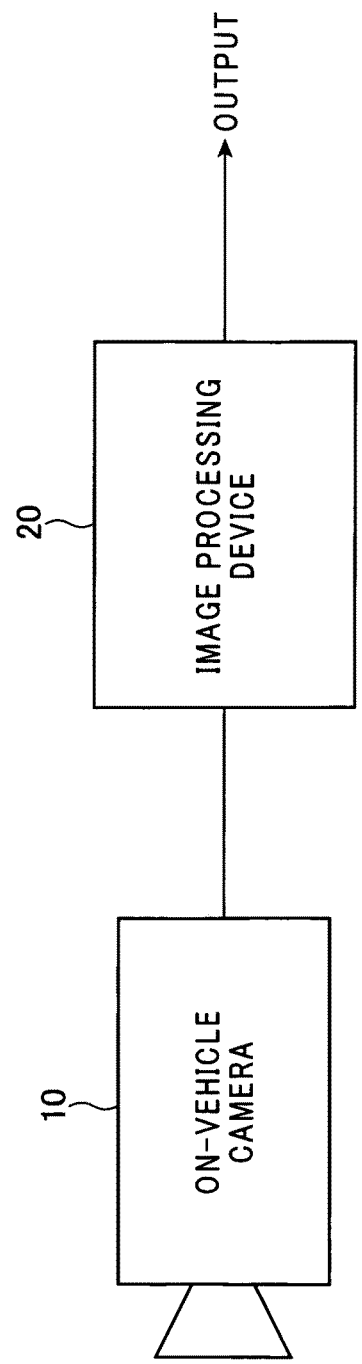
FIG. 1 is a functional block diagram showing a schematic configuration of a boundary line recognition apparatus according to an embodiment of the present invention.

Hereinafter, various embodiments of the present invention will be described with reference to the accompanying drawings.

In the following description of the various embodiments, like reference characters or numerals designate like or equivalent component parts throughout the several diagrams.

Embodiment

A description will be given of the boundary line recognition apparatus 1 according to an embodiment of the present invention with reference to FIG. 1 to FIG. 5.

FIG. 1 is a functional block diagram showing a schematic configuration of the boundary line recognition apparatus 1 according to the embodiment of the present invention. FIG. 2 is a functional block diagram showing a schematic configuration of an image processing device 20 in the boundary line recognition apparatus 1 according to the embodiment of the present invention.

As shown in FIG. 1, the boundary line recognition apparatus 1 has the on-vehicle camera 10 and the image processing device 20. The image processing device 20 performs image processing of image data of an area around the vehicle, which is obtained by the on-vehicle camera.

As shown in FIG. 2, the image processing device 20 has a plurality of data signal processors DPS 30, DSP 40, DSP 50, DSP 60, DSP 70, DSP 80, DSP 90, DSP 100, and DPS 110, a bus 120, a read only memory (ROM, not shown), a random access memory (RAM, not shown), and input/output port (I/O port).

The DSP 30 performs image processing to extract boundary line candidates on a driving lane of a vehicle from the image data acquired by the on-vehicle camera 10. Hereinafter, the DPS 30 will also be referred to as the "boundary line candidate extracting part 30", which corresponds to the "boundary line candidate extracting means".

Specifically, the boundary line candidate extracting part 30 performs a pattern matching process which is a known digital image processing, and the Hough transform as a feature extraction technique capable of extracting a straight line. The boundary line candidate extracting part 30 extracts boundary line candidates (for example, such as a white line on the driving lane of a vehicle) based on the results of the pattern matching process and the number of votes (as judgment results of solid lines and dotted lines) obtained by the Hough transform.

The DSP 40 calculates a likelihood which corresponds to a degree of probability of each of the boundary line candidates, extracted by the boundary line candidate extracting part 30, to be a boundary line. The DPS 40 will also be referred to as the "boundary line feature calculating part 40", and corresponds to the "boundary line feature calculating means".

The boundary line feature calculating part 40 performs the following process.

(1) The boundary line feature calculating part 40 uses, as a feature which represents the degree of probability to be the boundary line, one of brightness dispersion and an internal edge amount of a boundary line candidate extracted by the boundary line candidate extracting part 30.

In general, a boundary line painted on the surface of a driving lane or a road has a white color and irregularly reflects a light irradiated from the head lights of a vehicle and street lamps. That is, the boundary line has a large brightness dispersion when compared with that of the surface of the driving lane other than the boundary line.

The magnitude of the internal edge amount indicates a degree of flatness of an area. In other words, a large internal edge amount indicates a less edge part in the area. The area has a flat surface when the internal edge amount is a small value, and the area has a rough surface when a large value.

In general, because having a large degree of flatness, a boundary line has a less internal edge amount.

Figure 6:
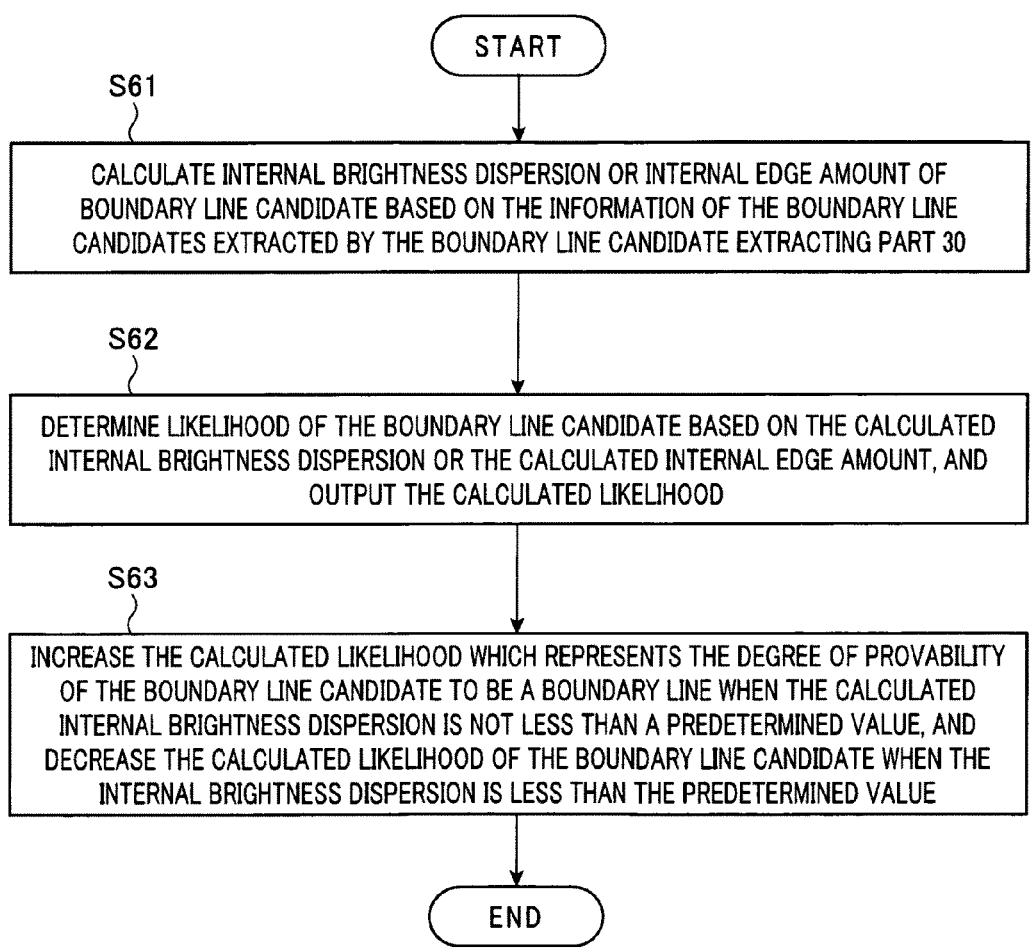
FIG. 6 is a flow chart showing an operation of the boundary line feature calculating part to calculate a likelihood of a boundary line candidate based on an internal brightness dispersion or an internal edge amount.

FIG. 6 is a flow chart showing an operation of the boundary line feature calculating part 40 to calculate a likelihood of a boundary line candidate based on an internal brightness dispersion or an internal edge amount.

The boundary line feature calculating part 40 calculates the internal brightness dispersion or the internal edge amount of a boundary line candidate (step S61), and determines and outputs a likelihood of the boundary line candidate based on the calculated internal brightness dispersion or the calculated internal edge amount (step S62). When the internal brightness dispersion is large, namely, is not less than a predetermined value, the likelihood which represents the degree of provability of the boundary line candidate to be a boundary line is increased. When the internal brightness dispersion is small, namely, less than the predetermined value, the likelihood of the boundary line candidate is decreased (step S63).

(2) The boundary line feature calculating part 40 uses, as a feature to express the degree of probability to be the boundary line, one of a dispersion in the edge direction of a boundary line candidate, a peak ratio, or a peak size in a histogram along the edge direction of the boundary line candidate.

In general, a boundary line has a straight line shape painted on the surface of a driving lane of a vehicle because a curvature of the boundary line is relatively small and the boundary line almost has a straight-line shape in image data acquired by the on-vehicle camera 10 even if the driving lane has a curve. Therefore the boundary line has a large dispersion value in the edge direction of the boundary line. In addition, because having a line shape, the boundary line has a large peak ratio and a large peak size in the histogram in the edge direction when compared with those of a surface area other than the boundary line on the driving lane.

Accordingly, it is possible for the boundary line feature calculating 40 to use, as the information or the feature to express the degree of probability to be the boundary line, the dispersion in the edge direction of a boundary line candidate, the peak ratio and the peak size in a histogram along the edge direction of the boundary line candidate.

Figure 7:
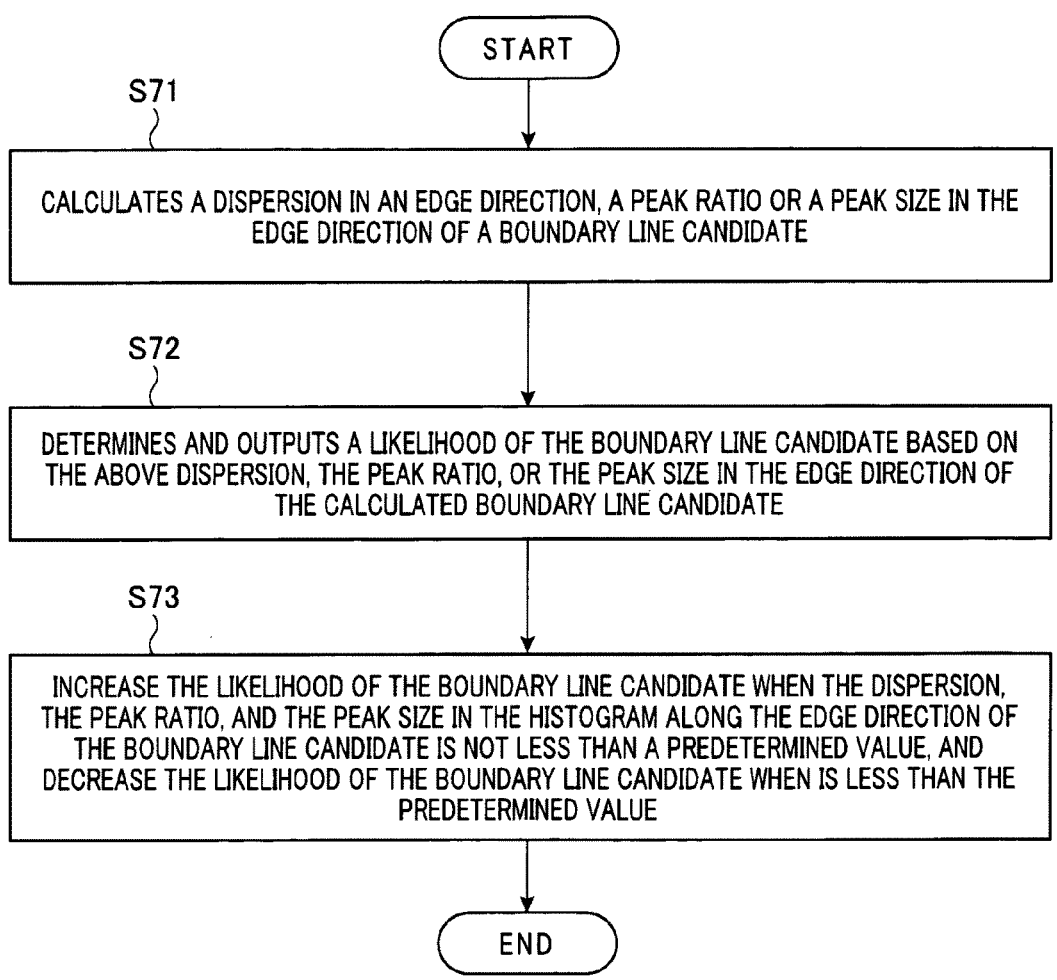
FIG. 7 is a flow chart showing the operation of the boundary line feature calculating part to calculate a likelihood of a boundary line candidate based on a dispersion in the edge direction of a boundary line candidate, a peak ratio or a peak size in a histogram along the edge direction of the boundary line candidate.

FIG. 7 is a flow chart showing an operation of the boundary line feature calculating part 40 to calculate a likelihood of a boundary line candidate based on a dispersion in the edge direction of a boundary line candidate, a peak ratio or a peak size in a histogram along the edge direction of the boundary line candidate.

The boundary line feature calculating part 40 calculates the dispersion in the edge direction, the peak ratio or the peak size in the edge direction of the boundary line candidate (step S71). The boundary line feature calculating part 40 then determines and outputs a likelihood of the boundary line candidate based on the above dispersion value, the peak ratio, or the peak size in the edge direction of the calculated boundary line candidate (step S72).

When the dispersion, the peak ratio, or the peak size in the histogram in the edge direction of the boundary line candidate have large values, namely, are not less than a predetermined value, the likelihood of the boundary line candidate is increased. When those have small values, namely, are less than the predetermined value, the likelihood of the boundary line candidate is decreased (step S73).

(3) The boundary line recognition apparatus 1 according to the present invention further has a driving lane surface feature extracting part 70. This driving lane surface feature extracting part 70 corresponds to the DSP 70 which serves as the "driving lane surface feature extracting means".

The driving lane surface feature extracting part 70 extracts a pattern or an average brightness of a boundary line candidate from the image data.

When a difference in pattern value or average brightness value between the boundary line candidate and an area (for example, which contains a repaired area, which will be explained later), extracted by the driving lane surface feature extracting part 70, is not more than a predetermined value, the boundary line feature calculating part 40 increases the likelihood of the boundary line candidate, where the likelihood, represents the degree of probability of the boundary line candidate to be the boundary line.

Specifically, there is a case where a shadow of a guardrail placed at a side of the driving lane exists. For example, when sunlight shines to the guardrail in a side direction, and a hollow part of the guardrail generates a shadow on the surface of the driving lane of a vehicle, and the line shaped shadow reflected on the driving lane is seen like a boundary line. Further, when a repaired area with black coal tar on the surface of the driving lane has a straight line shape, the repaired area is also seen like a boundary line.

In order to distinguish such an area containing a shadow and a repaired area from the actual boundary line on the driving lane of a vehicle, it is sufficient to compare the area in pattern and average brightness with the boundary line candidate.

Figure 8:
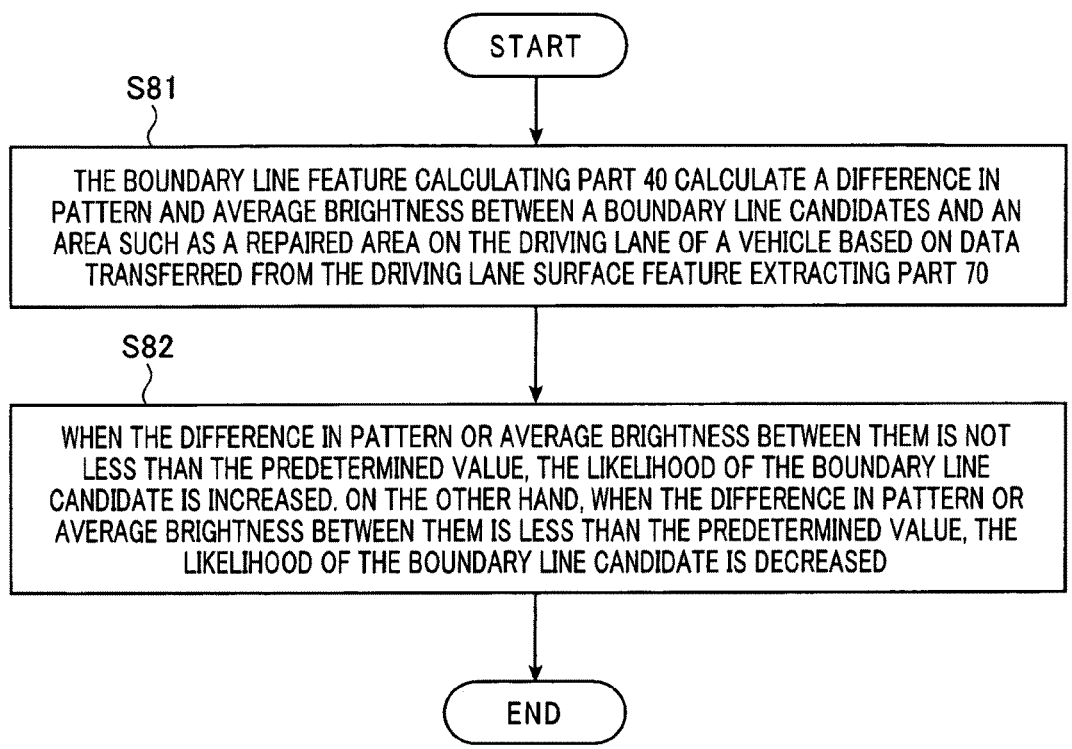
FIG. 8 is a flow chart showing the operation of the boundary line feature calculating part to calculate a likelihood of a boundary line candidate based on a difference in pattern and average brightness between a boundary line candidate and an area.

FIG. 8 is a flow chart showing an operation of the boundary line feature calculating part 40 to calculate a likelihood of a boundary line candidate based on a difference in pattern and average brightness between a boundary line candidate and an area other than the boundary line candidate.

The boundary line feature calculating part 40 calculates a difference in pattern and average brightness between the boundary line candidate and the above area such as a repaired area based on the data transferred from the driving lane surface feature extracting part 70 (step S81).

When the difference in pattern between them becomes large, namely, is not less than the predetermined value, the boundary line feature calculating part 40 judges both are different, and increases the likelihood of the boundary line candidate. In addition, when the difference in average brightness between them becomes large, namely, is not less than the predetermined value, the boundary line feature calculating part 40 also judges both are different, and increases the likelihood of the boundary line candidate. On the other hand, when the difference in pattern between them becomes small, namely, is less than the predetermined value, the boundary line feature calculating part 40 judges they are not different, and decreases the likelihood of the boundary line candidate. In addition, when the difference in average brightness between them becomes small, namely, is less than the predetermined value, the boundary line feature calculating part 40 also judges both do not different, and decreases the likelihood of the boundary line candidate (step S82).

(4) The boundary line recognition apparatus 1 according to the present invention further has an edge feature extracting part 80. This edge feature extracting part 80 corresponds to the DSP 80, and serves as the "edge feature extracting means".

When a difference in total edge amount between the boundary line candidate and an area (which will be explained later) extracted by the edge feature extracting part 80 is not more than a predetermine value, the boundary line feature calculating part 40 decreases the likelihood of the boundary line candidate, which represents the degree of probability of the boundary line candidate to be the boundary line.

Figure 9:
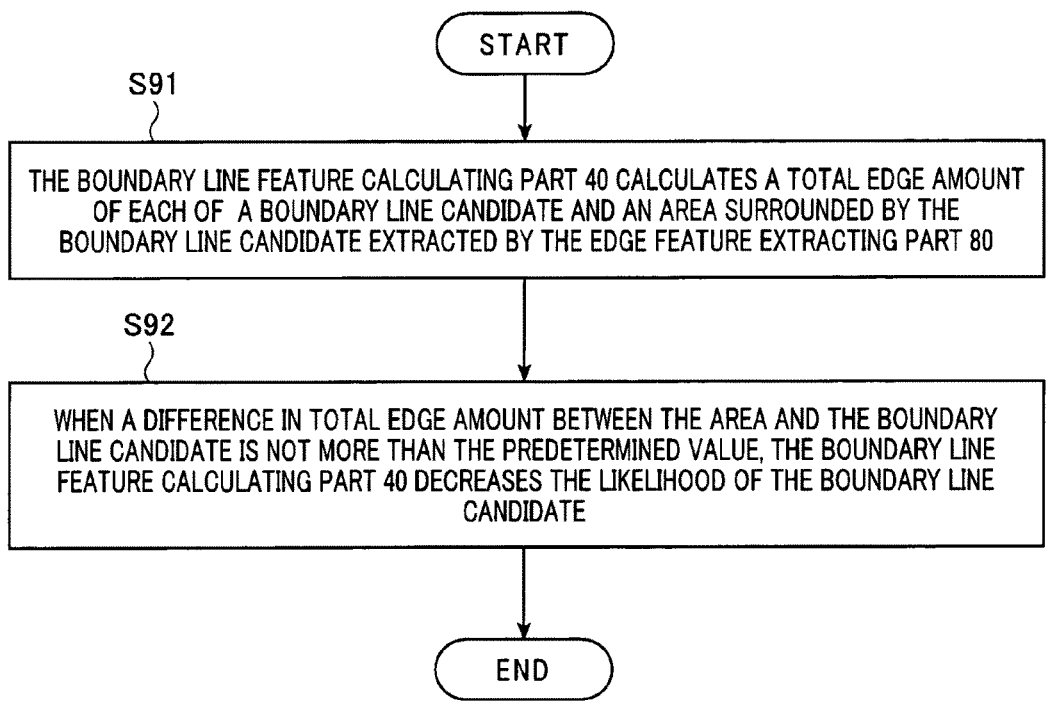
FIG. 9 is a flow chart showing the operation of the boundary line feature calculating part to calculate the likelihood of a boundary line candidate based on a total edge amount of the boundary line candidate and an area other than the boundary line candidate.

When a boundary line almost disappears and a difference in brightness between this boundary line and the surface of the driving lane becomes small, a person can see it as stains like a boundary line. This means that a person tends to recognize such stains as an emphasized pattern when there is no pattern on the driving lane, FIG. 9 is a flow chart showing an operation of the boundary line feature calculating part 40 to calculate the likelihood of a boundary line candidate based on the total edge amount of the boundary line candidate and the following area other than the boundary line candidate.

The boundary line feature calculating part 40 calculates a total edge amount of each of the boundary line candidate and the area surrounded by the boundary line candidate (step S91).

When the difference in total edge amount between the area and the boundary line candidate is not more than the predetermined value, the boundary line feature calculating part 40 decreases the likelihood of the boundary line candidate (step S92), which represents the degree of probability of the boundary line candidate to be the boundary line.

(5) The boundary line recognition apparatus 1 according to the present invention further has a stripe pattern detecting part 90 which corresponds to the DSP 90, and serves as the "stripe pattern detecting means".

When the stripe pattern detecting part 90 detects presence of a stripe pattern containing a plurality of stripe lines formed on the surface of the driving lane, the boundary line feature calculating part 40 decreases the likelihood of the boundary line candidate, which represents the degree of probability of the boundary line candidate to be the boundary line.

There is a case where a stripe pattern having stripe lines is formed on the driving lane in order to prevent slipping of a vehicle on the driving lane. In this case, the stripe lines have a low brightness than that of the surface of the driving lane other than the straight-line shaped parts.

Figure 10:
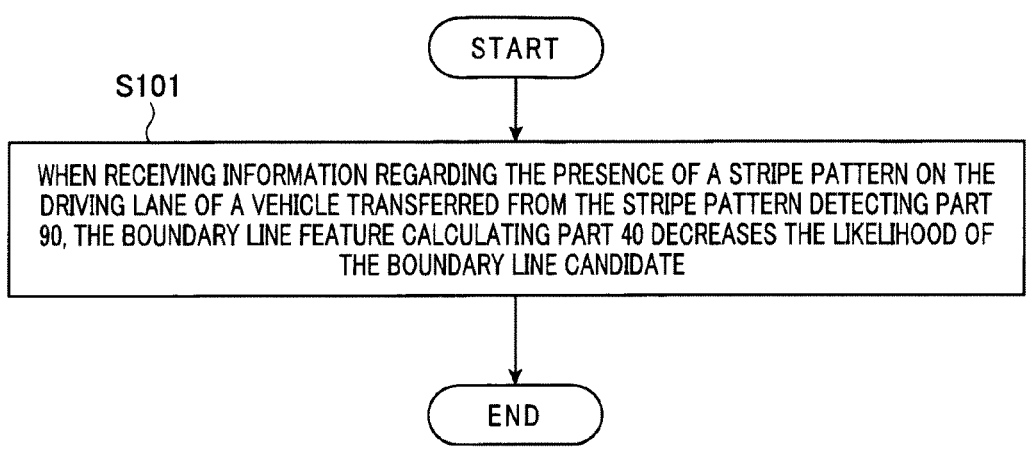
FIG. 10 is a flow chart showing the operation of the boundary line feature calculating part to calculate a likelihood of a boundary line candidate based on information regarding a stripe pattern on the driving lane of a vehicle detected by a stripe pattern detecting part.

FIG. 10 is a flow chart showing an operation of the boundary line feature calculating part 40 to calculate a likelihood of a boundary line candidate based on information regarding the presence of a stripe pattern on the driving lane of a vehicle detected by the stripe pattern detecting part 90.

When the stripe pattern detecting part 90 detects such a stripe pattern having stripe lines on the driving lane, and the boundary line feature calculating part 40 receives the information regarding the presence of the stripe pattern on the driving lane, the boundary line feature calculating part 40 decreases the likelihood of the boundary line candidate (step S101), which represents the degree of probability of the boundary line candidate to be the boundary line.

(6) The boundary line recognition apparatus 1 according to the present invention further has a traffic sign detecting part 100 which corresponds to the DSP 100 and serves as the "traffic sign detecting means".

When the traffic sign detecting part 100 detects a traffic sign, the boundary line feature calculating part 40 decreases the likelihood of the boundary line candidate, which represents the degree of probability of the boundary line candidate to be the boundary line.

In general, various types of traffic signs such as an arrow mark, a speed limit mark, a stop mark, and a pedestrian crossing are painted on a road.

Figure 11:
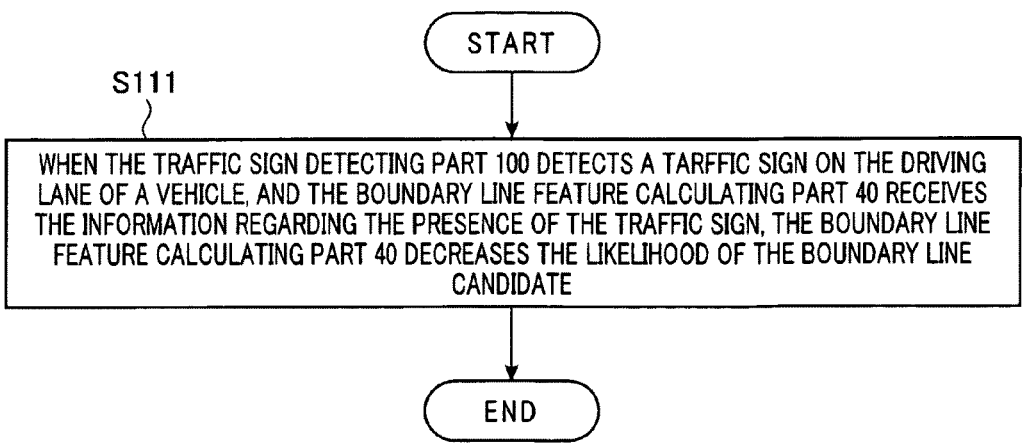
FIG. 11 is a flow chart showing the operation of the boundary line feature calculating part to calculate a likelihood of a boundary line candidate based on the presence of a traffic sign detected by the traffic sign detecting part.

FIG. 11 is a flow chart showing an operation of the boundary line feature calculating part 40 to calculate a likelihood of a boundary line candidate based on the presence of a traffic sign detected by the traffic sign detecting part 100.

When the traffic sign detecting part 100 detects such a traffic sign on the driving lane of a vehicle, and the boundary line feature calculating part 40 receives the information regarding the presence of the traffic sign, the boundary line feature calculating part 40 decreases the likelihood of the boundary line candidate (step S111), which represents the degree of probability of the boundary line candidate to be the boundary line.

(7) The boundary line recognition apparatus 1 according to the present invention further has a pair-boundary line candidate detecting part 110 which corresponds to the DSP 110, and serves the a "pair-boundary line candidate detecting means".

When the pair-boundary line candidate detecting part 110 detects a pair of boundary line candidates placed on the driving lane at both side of a vehicle, the boundary line feature calculating part 40 decreases the likelihood of a boundary line candidate which is present between the detected pair of the boundary line candidates, where the likelihood of the boundary line candidate represents the degree of probability of the boundary line candidate to be the boundary line.

When the vehicle is running on a driving lane, there are boundary lines on both sides of the driving lane along the driving direction of the vehicle.

Figure 12:
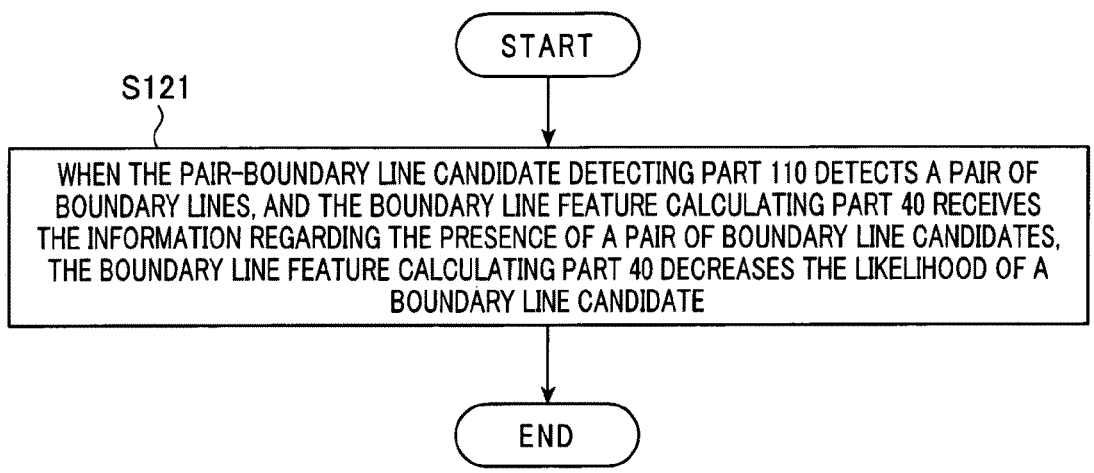
FIG. 12 is a flow chart showing the operation of the boundary line feature calculating part to calculate a likelihood of a boundary line candidate based on a presence of a pair of boundary line candidates on the driving lane of a vehicle detected by a pair-boundary line candidate detecting part.

FIG. 12 is a flow chart showing an operation of the boundary line feature calculating part 40 to calculate a likelihood of a boundary line candidate based on a presence of a pair of boundary line candidates on the driving lane of a vehicle detected by the pair-boundary line candidate detecting part 110.

When the pair-boundary line candidate detecting part 110 detects a pair of boundary lines at both sides of the driving lane along the driving direction of the vehicle, and the boundary line feature calculating part 40 receives the information regarding the presence of a pair of boundary line candidates, the boundary line feature calculating part 40 decreases the likelihood of a boundary line candidate (step S121), which is present between the pair of the boundary line candidates, where the likelihood of the boundary line candidate represents the degree of probability of the boundary line candidate to be the boundary line.

The DPS 50 is a digital signal processor to multiplies the likelihoods which are obtained in the calculations (1) to (7) performed by the DSP 40, and outputs the calculated likelihood of the boundary line candidate. This calculated likelihood represents the degree of probability of the boundary line candidate to be a boundary line. Hereinafter, the DSP 50 will be referred to as the "boundary line feature combining part 50".

The boundary line feature combining part 50 calculates a final likelihood of each of the boundary line candidates by performing multiplication of the likelihoods using a framework of Bayesian inference.

For example, when the boundary line feature calculating part 40 as the DSP 40 calculates two likelihoods A and B by performing two processes of the processes (1) to (7), the final likelihood of the boundary line candidate becomes 0.78(= (0.6*0.7)/(0.6*0.7+0.4*0.3)), where A is 0.6, and B is 0.7.

In the above calculation, the values 0.4 and 0.3 indicate unlikelihood values of A and B, respectively.

Even if the boundary line feature calculating part 40 performs additional processes in addition to the processes (1) to (7), the number of likelihoods to be calculated is only increased, but the likelihood of a boundary line candidate is not essentially and substantially changed. Thus, the boundary line recognition apparatus according to the present invention has a high extensible capability and applicability. This can provide the boundary line recognition apparatus capable of easily changing the number of the processes (for example, decreasing the processes or adding newly processes) in order to calculate the final likelihood of the boundary line candidate with high precision and highly robust control.

In addition, the boundary line feature combining part 50 changes and outputs the likelihood of the boundary line candidate based on the arrangement of the boundary line candidate on the driving lane extracted by the boundary line candidate extracting part 30. For example, when the boundary line candidate is approximately at right angle to the driving direction of the vehicle on the driving lane in the image data acquired by the on-vehicle camera 10, or when the boundary line candidate is separated from the side surface of the vehicle by a predetermined distance, the boundary line feature combining part 50 decreases the likelihood of the boundary line candidate, which represents the degree of probability of the boundary line candidate to be the boundary line, and outputs the decreased likelihood.

The DSP 60 is a digital signal processor to select the boundary line candidate having the maximum likelihood in the likelihoods output from the DPS 50, and recognizes this boundary line candidate as the boundary line of the driving lane of the vehicle. As previously described, the DPS 60 corresponds to the "boundary line selecting part 60".

Because the boundary line feature combining part 50 outputs the likelihood of each of boundary line candidates, the boundary line selecting part 60 selects the boundary line candidate having the maximum likelihood as the boundary line of the driving lane of the vehicle.

The DPS 70 is a digital signal processor to extract features from the image data obtained by the on-vehicle camera 10, where the features are the area between such boundary line candidates on the driving lane of the vehicle, the pattern of the boundary line itself, and the average brightness of the boundary line candidate. As previously described, the DSP 70 corresponds to the driving lane surface feature extracting part 70.

For example, there is a case where a shadow of a guardrail which is placed at a side of the driving lane of a vehicle occurs when sunlight from a side direction shines to the guardrail, and a hollow part of the guardrail generates the shadow on the surface of the driving lane. In this case, such a shadow of a line shape on the driving lane is seen like a boundary line. Further, when a repaired area with a black coal tar has a straight line shape, the repaired area appears like a boundary line. Accordingly, the DSP 70 extracts a pattern of such a repaired area and a pattern of the boundary line by a pattern matching method and using a difference in brightness.

The DSP 80 is a data signal processor capable of extracting a total edge amount of boundary line candidates extracted by the boundary line candidate extracting part 30 and an area between the boundary line candidates from the image data obtained by the on-vehicle camera 10. As previously described, the DSP 80 corresponds to the edge feature extracting part 80.

The total edge amount can be obtained by extracting edges from binarized image data obtained from the image data acquired by the on-vehicle camera 10, and then by calculating a sum of the extracted edges.

The DSP 90 is a data signal processor capable of detecting a line-shaped pattern, from the image data obtained by the on-vehicle camera 10, having an edge amount of not less than a predetermined value in the area near the vehicle in the direction which is approximately at right angle to the driving direction of the vehicle. As previously described, this DSP 90 corresponds to the stripe pattern detecting part 90.

In general, a longitudinal stripe formed on a driving lane to prevent slipping of a vehicle has a low brightness when compared with the brightness on the surface of the driving lane other than such a longitudinal stripe. However, there is a case where they have approximately the same brightness. In this case, an edge amount is calculated from binarized image data obtained from the image data from the on-vehicle camera 10. The stripe pattern detecting part 90 then detects, as a longitudinal stripe, the pattern having the edge amount of not less than the predetermined value in the driving direction of the driving lane of the vehicle.

The DSP 100 is a data signal processor capable of detecting traffic signs painted on the driving lane of a vehicle obtained from image data acquired by the on-vehicle camera 10. As previously described, the DSP 100 corresponds to the traffic sign detecting part 100.

The traffic sign detecting part 100 detects traffic signs painted on the driving lane of a vehicle by using pattern matching method. There is a pedestrian crossing as a traffic sign to be detected in addition to an arrow mark, a speed limit mark, and a stop mark painted on the surface of the driving lane.

The DSP 110 is a data signal processor capable of detecting a presence of a pair of boundary line candidates, in the boundary line candidates extracted by the boundary line candidate extracting part 30, placed at both sides on the driving lane of a vehicle along the driving direction of the vehicle. As previously described, the DSP 110 corresponds to the pair-boundary line candidate detecting part 110.

In general, there are boundary lines at both sides of the vehicle along the driving direction of the vehicle when the vehicle is running on the driving lane. Therefore the pair-boundary line candidate detecting part 110 detects a pair of boundary line candidates in the boundary line candidates extracted by the boundary line candidate extracting part 30, which is placed at both sides of the vehicle along the driving direction of the vehicle, based on a relative position to the vehicle in the image data.

(Features of the Boundary Line Recognition Apparatus 1)

As described above in detail, when the boundary line recognition apparatus 1 according to the present invention calculates the feature of a boundary line candidate, the boundary line feature calculating part 40 (or the DSP 40) firstly calculates likelihoods which show various types of features of the boundary line candidate, where each of the likelihoods represents the degree of probability of the boundary line candidate to be the boundary line. In other words, the boundary line feature calculating part 40 calculates all of the features of each boundary line candidate by using such likelihoods. Accordingly, even if the boundary line feature calculating part 40 performs a different process, it is possible for the boundary line recognition apparatus 1 to easily obtain the final likelihood of the boundary line candidate by multiplying the calculated likelihoods of the boundary line candidate because the boundary line feature calculating part 40 calculates all of the feature of the boundary line candidate by using these likelihoods.

Accordingly, even if the structure of the boundary line feature calculating part 40 is changed by eliminating a function or by adding an additional function, or even if the boundary line feature calculating part 40 is replaced with another boundary line feature calculating means, it is possible for boundary line recognition apparatus 1 to easily combine the outputs (that is, the likelihoods) of the boundary line feature calculating part 40 because the boundary line feature calculating part 40 calculates all of features of a boundary line candidate by using likelihoods.

In addition, the boundary line feature combining part 50 changes the likelihood of the boundary line candidate based on the arrangement of the boundary line candidate on the surface of the driving lane of the vehicle extracted by the boundary line candidate extracting part 30. This makes it possible to eliminate objects and marks on the driving lane which are apparently different from a boundary line on the driving lane.

Because the boundary line feature calculating part 40 uses, as a feature of each boundary line candidate, at least one of a brightness dispersion of the boundary line candidate or an internal edge amount of the boundary line candidate, it is possible to obtain a difference in brightness of boundary line candidates based on the brightness dispersion, and also to obtain a difference in flatness of pattern of the boundary line candidates based on the internal edge amount.

That is, this makes it possible to calculate a scratch formed on a guardrail or the surface of the driving lane of a vehicle which are different in brightness and flatness of pattern, or to obtain a difference between a repaired area and a boundary line on the driving lane. It is therefore possible for the boundary line recognition apparatus 1 according to the present invention to obtain the likelihood of a boundary line candidate with high accuracy.

Further, the boundary line feature calculating part 40 uses, as a feature which indicates a degree of probability to be a boundary line, one of a dispersion in edge direction of a boundary line candidate extracted by the boundary line candidate extracting part 30, or a peak ratio or peak size in a histogram along edge direction in image data.

Figure 3A:
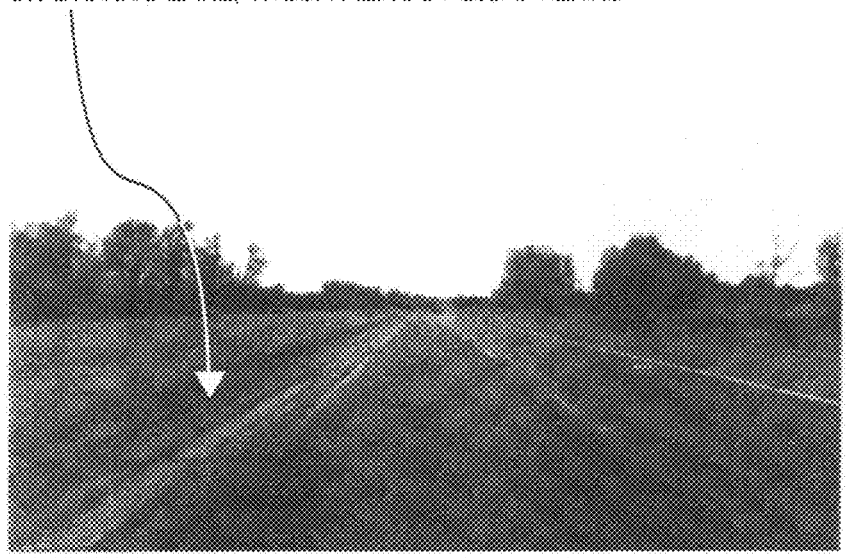
FIG. 3A is a diagram showing an example of a white boundary line on a driving lane which almost disappears.
Figure 3B:
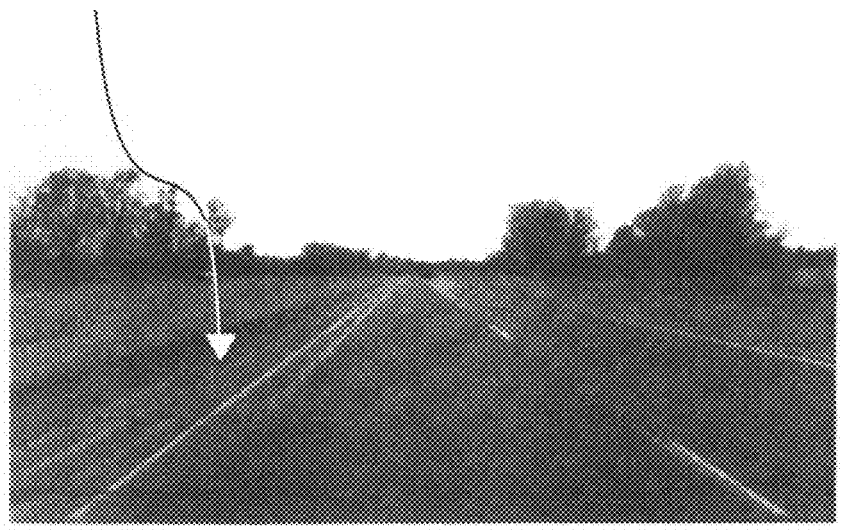
FIG. 3B is a diagram showing an example of a narrow-width boundary line on a driving lane.

FIG. 3A is a diagram showing an example of a white boundary line on the driving lane of a vehicle which almost disappears. FIG. 3B is a diagram showing an example of a narrow-width boundary line on a driving lane.

Accordingly, as shown in FIG. 3A and FIG. 3B, it is possible for the boundary line recognition apparatus 1 according to the present invention to obtain a difference between a boundary line, a scratch line, and a repaired area on the driving lane of a vehicle based on a brightness dispersion along an edge direction, or a peak ratio or a peak size in a histogram along the edge direction of a boundary line candidate. The boundary line recognition apparatus 1 therefore makes it possible to obtain a likelihood of the boundary line with more high accuracy.

The boundary line recognition apparatus 1 has the driving lane surface feature extracting part 70 capable of extracting, from image data obtained by the on-vehicle camera 30, an area on a driving lane between boundary line candidates, and a pattern or an average brightness of the boundary line candidate itself extracted by the boundary line candidate extracting part 30. The boundary line feature calculating part 40 decreases the likelihood of the boundary line candidate when a difference in pattern or brightness between the boundary line candidates is a predetermined value.

Figure 4A:
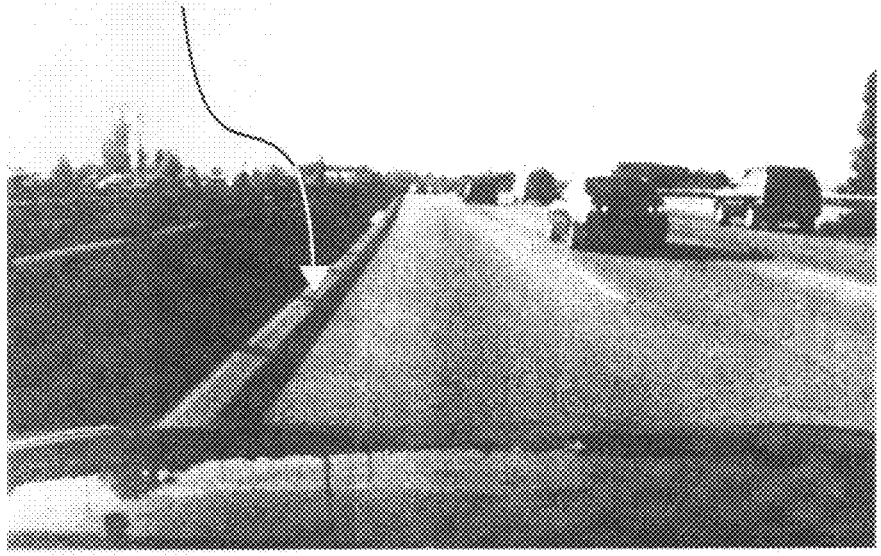
FIG. 4A is a diagram showing an example of a shadow of a guardrail for pedestrians which is placed on a side of a driving lane.

FIG. 4A is a diagram showing an example of a shadow of a guardrail for pedestrians which is placed on a side of a driving lane. FIG. 4A is a diagram showing an example of a shadow of a concrete barrier for vehicles which is placed on a side of a driving lane.

Figure 4B:
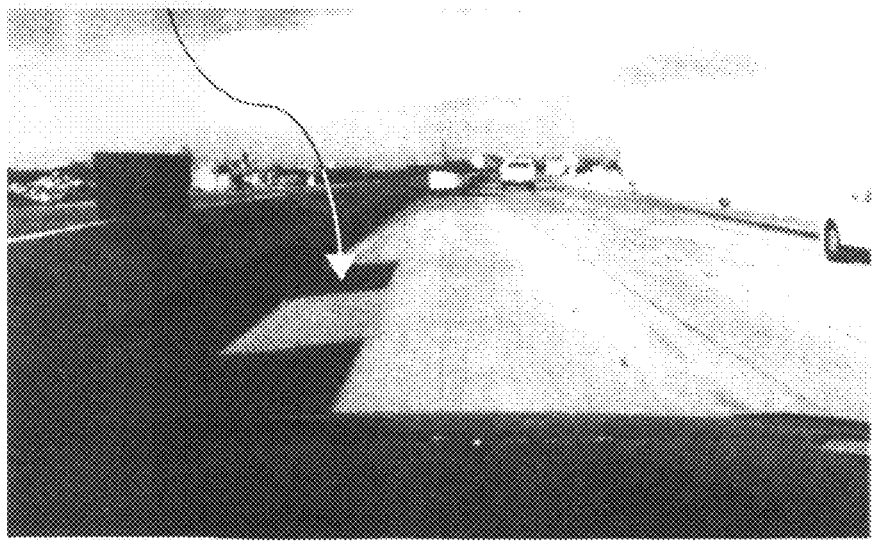
FIG. 4B is a diagram showing an example of a shadow of a concrete barrier for vehicles which is placed on a side of a driving lane.

Accordingly, as shown in FIG. 4A and FIG. 4B, when there is an area such as a shadow of a guardrail and a repaired area on a driving lane which is different in brightness and pattern from the boundary line, the boundary line recognition apparatus 1 can decrease the likelihood of those shadow and the repaired area, and his makes it possible to increase the likelihood as the degree of probability of the boundary line extraction with high accuracy.

The boundary line recognition apparatus 1 further has the edge feature extracting part 80 capable of extracting a total edge amount of an area between boundary line candidates extracted by the boundary line candidate extracting part 30 and a total edge amount of the boundary line candidate. When the total edge amount extracted by the boundary line feature calculating part 40 and the edge feature extracting part 80 is a predetermined value, the boundary line recognition apparatus 1 decreases the likelihood of the boundary line candidate.

Accordingly, even if a boundary line on the driving lane of a vehicle disappears, it is possible to prevent decreasing the degree of probability of the boundary line candidate.

In addition, the boundary line recognition apparatus 1 further has the stripe pattern detecting part 90 capable of detecting a stripe pattern in an area having a brightness of not more than a predetermined value along the driving direction of the vehicle, where this area is approximately at right angle to the driving direction of the vehicle on the driving lane, and near the boundary line candidate extracted by the boundary line candidate extracting part 30 from the image data obtained by the on-vehicle camera 10.

Figure 5:
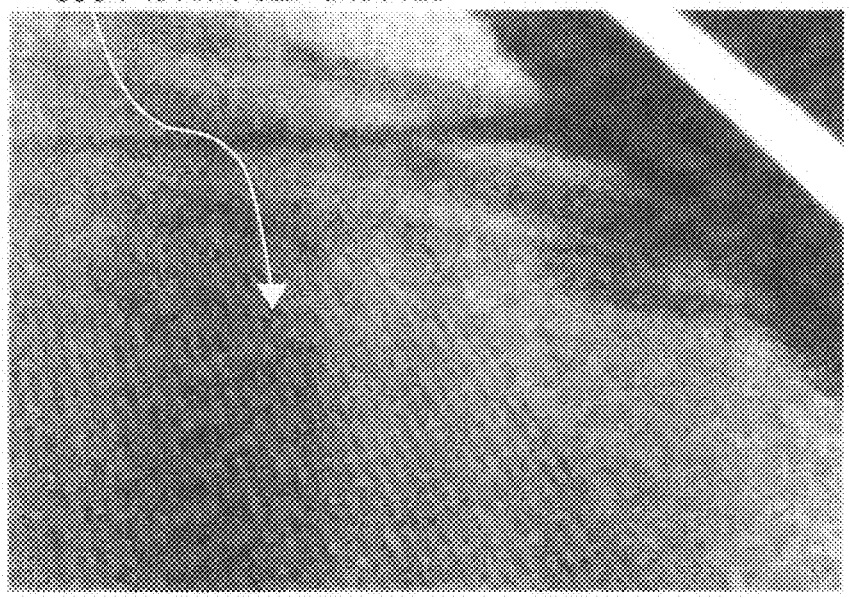
FIG. 5 is a diagram showing an example of longitudinal stripes such as anti-slip grooves formed on the surface of a driving lane.

FIG. 5 is a diagram showing an example of vertical grooves such as anti-slip grooves formed on a driving lane.

Further, the boundary line feature calculating part 40 in the boundary line recognition apparatus 1 according to the present invention decreases the likelihood of the boundary line candidate when the stripe pattern detecting part 90 detects vertical grooves such as anti-slip grooves formed on a driving lane shown in FIG. 5. This makes it possible to decrease the likelihood of the boundary line candidates corresponding to such vertical grooves such as anti-slip grooves.

Still further, the boundary line recognition apparatus 1 has the traffic sign detecting part 100 capable of detecting traffic signs painted on the driving lane of a vehicle from image data obtained by the on-vehicle camera 10. The boundary line feature calculating part 40 decreases the likelihood of the boundary line candidate when the traffic sign detecting part 100 detects a traffic sign. Accordingly, it is possible to decrease the likelihood of the boundary line candidates corresponding to traffic signs.

Moreover, the boundary line recognition apparatus 1 has the pair-boundary line candidate detecting part 110 capable of detecting a presence of a pair of boundary line candidates placed at both sides of the vehicle in the driving direction on the driving lane of the vehicle. The boundary line feature calculating part 40 decreases the likelihood of the boundary line candidate which is placed between the detected pair of boundary line candidates when the pair-boundary line candidate detecting part 110 detects the presence of the pair of boundary line candidates.

Accordingly, it is possible for the boundary line feature calculating part 40 in the boundary line recognition apparatus 1 according to the present invention to decrease the likelihood of the boundary line candidates, for example, corresponding to a deleted trace of a boundary line and a central line on the driving lane as a supplemental line, placed in the inside area between the pair of boundary lines which are present at both sides of the vehicle.

[Other Modifications]

In the structure of the boundary line recognition apparatus 1 according to the present invention previously described, each of various processes is assigned to each of a plurality of digital signal processors. However, the present invention is not limited by this structure.

(1) For example, it is possible to assign all of the processes to a program, and to perform the program by a single DSP.

(2) In the structure of the boundary line recognition apparatus 1 according to the present invention previously described, the boundary line feature calculating part 40 is assigned to the single DSP 40. However, the present invention is not limited by this structure. For example, various processes performed in the boundary line feature calculating part 40 can be assigned to a plurality of digital signal processors. This makes it possible to achieve a high speed processing.

(Other Aspects of the Present Invention)

In addition to the scope of the boundary line recognition apparatus previously described, the present invention further has following aspects and features.

The likelihood of a boundary line candidate of the driving lane of a vehicle, which represents the degree of probability to be a boundary line can be changed according to the position of the boundary line on the driving lane.

For example, when (1) there is a pair of lines which is placed in the inside of the driving lane of the vehicle, and formed approximately in parallel to the driving direction on the driving lane of the vehicle, (2) when a width between the pair of lines approximately equal to a width of the driving lane, and (3) when there is a single line such as a repair line and a fine central line, which is not a pair of lines, placed between the pair of boundary lines, the degree of probability of such lines to be a boundary line is low.

In order to correctly detect or recognize the above case, the boundary line feature combining means (which corresponds to the boundary line feature combining part 50) changes the likelihood of the boundary line candidate based on the arrangement of the boundary line candidate extracted by the boundary line candidate extracting means (which corresponds to the boundary line candidate extracting part 30), and outputs the optimum likelihood. For example, this can eliminate the boundary line candidate which is not apparently a boundary line according to the results of the pattern matching process, and thereby increase the likelihood, as the degree of probability to be the boundary line, of the boundary line candidates to be selected as the optimum boundary line candidate.

By the way, there is a case where a wrong recognition can occur to recognize a scratch and a repair line on the driving lane of a vehicle as a boundary line. In this case, using brightness and a flatness degree (as a degree of flatness) of the boundary line candidate can avoid such a wrong recognition.

When the boundary line is compared in brightness with such a part of scratch or repair line on the driving lane of the vehicle, the boundary line is a flat line and has a single color (ordinarily, has a white color). On the other hand, such a scratch and a repair line are not flat, and are different in flatness degree from the boundary line.

It is preferable to use at least one of a brightness dispersion and an internal edge amount of each of the boundary line candidates extracted by the boundary line candidate extracting means as the feature which represents the degree of probability to be a the boundary line.

This can obtain a difference in brightness and internal edge amount of the boundary line candidates based on the brightness dispersion. It is thereby possible to correctly obtain the likelihood as the degree of probability of the boundary line candidates to be a boundary line.

There is a case to occur a wrong recognition to recognize a slight scratch line and a repair line as a boundary line. In order to avoid such a wrong recognition, it is sufficient to detect a unity in direction of edge points and near areas at both sides of a boundary line. That is, because the boundary line is a flat line having a single color (such as a white color), previously described, the boundary line has a clear boundary between both sides of the boundary line and the surface of the driving lane when compared with that of a slight scratch line and a repair line.

It is preferable for the boundary line feature calculating means (which corresponds to the boundary line feature calculating part 40) to use, as the feature indicating the degree of probability of the boundary line candidate to be a boundary line, one of a dispersion degree in an edge direction of each of the boundary line candidates and a ratio or a size of a peak in histogram along the edge direction of each of the boundary line candidates extracted by the boundary line candidate extracting means.

This makes it possible to obtain a difference between a boundary line, a slight scratch line, and a repair line based on one of the dispersion degree, and the peak ratio or the peak size in histogram in the edge direction of the boundary line candidates.

In addition, there is a case to cause a wrong recognition to recognize, as a boundary line, a shadow of a guardrail placed at a side of a driving lane and a repair line on a surface of the driving lane. That is, this makes a straight line of sunlight on the surface of the driving lane when lateral direct sunlight passes through the guardrail, and causes a wrong recognition to recognize the straight line of sunlight on the surface of the driving lane as a boundary line. Still further, there is a case to cause a wrong recognition to recognize an area with coal tar of blown or black color as a straight boundary line.

It is preferable to evaluate information regarding the above area on the surface of the driving lane as a degree of probability to be a boundary line. For example, because the area on the surface of the driving lane is different in brightness and pattern from another boundary line candidate when this area has a high probability of being a shadow, it is possible to detect whether or not the brightness and pattern thereof are the same of the boundary line candidate or not.

In another aspect of the present invention, there is provided the boundary line recognition apparatus which further has the driving-lane surface feature extracting means (which corresponds to the driving-lane surface feature extracting part 70) capable of extracting features including a pattern and an average brightness of:

(a) an area on the driving lane placed between the boundary line candidates, and (b) each of the boundary line candidates, extracted from the image data acquired by the on-vehicle camera by the boundary line candidate extracting means.

In this structure, the boundary line feature calculating means decreases a likelihood as the degree of probability of the boundary line candidate when a difference in the pattern or the average brightness between the area and the boundary line candidates is not more than a predetermined value.

The boundary line recognition apparatus having the driving-lane surface feature extracting means makes it possible to increase the likelihood as the degree of probability of the boundary line candidate to be the boundary line when a difference in pattern and average brightness between the area on the surface of the driving lane and the boundary line candidate is not less than the predetermined value, because it is a high probability that the boundary line candidate is different from the pattern on the surface of the driving lane.

Further, this structure of the boundary line recognition apparatus makes it possible to decrease the likelihood as the degree of probability of the boundary line candidate to be the boundary line when a difference in pattern and average brightness between the area on the surface of the driving lane and the boundary line candidate is not more than the predetermined value, because it is a high probability that the boundary line candidate is equal to the area on the surface of the driving lane It is possible to have an extremely low difference in brightness between a boundary line and the surface of the driving lane when the boundary line almost disappears or is partially removed. In this case, the driver can recognize the boundary line as stains on the surface of the driving lane. However, the image processing cannot correctly recognize the boundary line because the boundary line has a weak edge.

The human sensitivity can correctly recognize the boundary line on the surface of the driving lane even if it almost disappears on the driving lane. That is, when there is no pattern on the driving lane, the human sensitivity emphasizes the stains on the driving lane. It is therefore possible for the boundary line recognition apparatus to perform the image processing by emphasizing the boundary line.

Even if the boundary line which almost disappears has a weak edge, it is possible to increase the likelihood as the degree of probability of the boundary line candidate to be the boundary line by emphasizing the stains as the boundary line when the surface of the driving lane has a flat surface. This process of the boundary line recognition apparatus can approach the human sensitivity.

The boundary line recognition apparatus as another aspect of the present invention further has the edge feature extracting means (which corresponds to the edge feature extracting part 80) capable of extracting a total edge amount of the area between the boundary line candidates extracted by the boundary line candidate extracting means and a total edge amount of the boundary line candidates on the driving lane from the image data obtained by the on-vehicle camera. When a difference in the total edge amounts between the area and the boundary line candidates is not more than a predetermined value, the boundary line feature calculating means decreases the likelihood as the degree of probability of the boundary line candidate to be the boundary line. This makes it possible to avoid decreasing the likelihood of the boundary line candidate even if the boundary line almost disappears and has a weak edge.

By the way, it is possible to cause a wrong recognition to detect, as a boundary line, a longitudinal stripe or a vertical line formed on the driving lane of a vehicle. Because there is a case where the longitudinal stripe formed on the driving lane has a dark color and an area near the longitudinal stripe becomes a light color, the area having no longitudinal stripe becomes light and both side of this area can be seen like a boundary line. It is therefore possible to avoid incorrect recognition by decreasing the likelihood of the boundary line candidate when the side area (which is an area approximately at right angle to the driving direction of the vehicle) of the boundary line candidate has a large amount of vertical edges.

The boundary line recognition apparatus as another aspect of the present invention further has the stripe pattern detecting means (which corresponds to the stripe pattern detecting part 90). The stripe pattern detecting means is capable of detecting a stripe pattern when the brightness of the stripe pattern along the driving direction is not more than a predetermined value, where the stripe pattern is placed in an area on the driving lane, which is approximately at right angle in the driving direction of the vehicle to the boundary line candidates extracted, from the image data acquired by the on-vehicle camera, by the boundary line candidate extracting means.

When the stripe pattern detecting means detects the stripe pattern, the boundary line feature calculating means decreases the likelihood as the degree of probability of the boundary line candidate to be a boundary line. This makes it possible to decrease the likelihood as the degree of probability of the stripe pattern to be the boundary line when the driving lane has longitudinal stripes which are formed on the surface of the driving lane in order to avoid slipping of vehicles.

There often occurs a wrong recognition to recognize, as a boundary line, traffic signs such as a pedestrian crossing, an arrow mark, a speed limit mark, and a stop mark on the driving lane.

In order to avoid such a wrong recognition, the boundary line recognition apparatus as another aspect of the present invention further has the traffic sign detecting means (which corresponds to the traffic sign detecting part 100) capable of detecting traffic signs painted on the driving lane from the image data obtained by the on-vehicle camera. When the traffic sign detecting means detects a traffic sign, the boundary line feature calculating means decreases the likelihood as the degree of probability of a boundary line candidate to be a boundary line. This makes it possible to decrease the likelihood as the degree of probability of the traffic sign painted on the driving lane.

It is possible to detect the traffic signs painted on the driving lane of a vehicle by performing image recognition method such as a pattern matching.

In general, the driving lane has a pair of boundary lines which is placed at both sides of the driving lane. It is therefore possible to increase the likelihood as the degree of probability of the boundary line candidates to be a boundary line by eliminating a boundary line candidate which is not a pair as noise.

The boundary line recognition apparatus as another aspect of the present invention further has a pair-boundary line candidate detecting means (which corresponds to the pair-boundary line candidate detecting part 110) capable of detecting the presence of a pair of boundary line candidates at both sides of the driving lane of the vehicle.

When the pair-boundary line candidate detecting means detects the presence of a pair of boundary line candidates at both sides of the driving lane of the vehicle, the boundary line feature calculating means decreases the likelihood as the degree of probability of a boundary line candidate which is placed between the detected pair of boundary line candidates.

This makes it possible to decrease the likelihood as the degree of probability of boundary line candidates to be a boundary line, placed in an inside of a pair of boundary line candidates placed at both sides of the driving lane, such as an erased trace of a boundary line and a center line of the driving lane. The boundary line recognition apparatus according to the present invention can be adapted for cares where the boundary lines and central lines are different types.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A boundary line recognition apparatus comprising:
    an on-vehicle camera configured to acquire image of an area around a vehicle and to output image data;
    a boundary line candidate extracting processor extracting one or more boundary line candidates which are present on a driving lane of the vehicle from the image data obtained by the on-vehicle camera;
    a boundary line feature calculating processor calculating a likelihood which represents a degree of probability that a subject boundary line candidate is a boundary line on the driving lane extracted by the boundary line candidate extracting processor, wherein the subject boundary line candidate is part of the one or more boundary line candidates;
    a boundary line selecting processor selecting a final boundary line candidate having a maximum likelihood as the boundary line on the driving lane from among the one or more boundary line candidates; and
    a stripe pattern detecting processor detecting, from the image data obtained by the on-vehicle camera, a stripe pattern of indentation on the driving lane by determining that, the stripe pattern has a brightness of not more than a predetermined value, and
    wherein the boundary line feature calculating processor decreases the likelihood of the subject boundary line candidate when the stripe pattern detecting processor detects the presence of the stripe pattern.

2. The boundary line recognition apparatus according to claim 1, further comprising an edge feature extracting processor extracting from the image data obtained by the on-vehicle camera, a total edge amount of an area outside of the subject boundary line candidate on the driving lane, and a total edge amount of the subject boundary line candidate,
    wherein the boundary line feature calculating processor decreases the likelihood of the subject boundary line candidates when a difference in the total edge amount of the area outside of the subject boundary line candidate and the total edge amount of the subject boundary line candidate is a predetermined value.

3. The boundary line recognition apparatus according to claim 1, further comprising a traffic sign detecting processor detecting a traffic sign painted on the driving lane of the vehicle from the image data obtained by the on-vehicle camera, wherein the boundary line feature calculating processor decreases the likelihood of the subject boundary line candidate when the traffic sign detecting processor detects a traffic sign.

4. The boundary line recognition apparatus according to claim 1, further comprising a pair-boundary line candidate detecting processor detecting a presence of a pair of boundary line candidates, placed at both sides of the vehicle in the driving direction on the driving lane of the vehicle, in the one or more boundary line candidates extracted by the boundary line candidate extracting processor,
    wherein the boundary line feature calculating processor decreases the likelihood of the subject boundary line candidate placed in an area between the pair of boundary line candidates detected by the pair-boundary line candidate detecting section when the pair-boundary line candidate detecting processor detects the pair of boundary line candidates.

* * * * *